(12) United States Patent
Vauchel (10) Patent No.: US 8,919,667 B2
(45) Date of Patent: Dec. 30, 2014

(54) NACELLE WITH A VARIABLE NOZZLE SECTION

(75) Inventor: Guy Bernard Vauchel, Harfleur (FR)

(73) Assignee: Aircelle, Gonfreville l'Orcher (FR)

( * ) Notice: Subject to any disclaimer, the term of this patent is extended or adjusted under 35 U.S.C. 154(b) by 951 days.

(21) Appl. No.: 13/120,703

(22) PCT Filed: Jul. 10, 2009

(86) PCT No.: PCT/FR2009/000861
§ 371 (c)(1),
(2), (4) Date: Mar. 24, 2011

(87) PCT Pub. No.: WO2010/034893
PCT Pub. Date: Apr. 1, 2010

(65) Prior Publication Data
US 2011/0174899 A1    Jul. 21, 2011

(30) Foreign Application Priority Data
Sep. 24, 2008   (FR) ..................... 08 05243

(51) Int. Cl.
*B64D 29/06*   (2006.01)
*F02K 1/72*   (2006.01)
*B64D 33/04*   (2006.01)
*F02K 1/80*   (2006.01)

(52) U.S. Cl.
CPC . *F02K 1/72* (2013.01); *B64D 29/06* (2013.01); *B64D 33/04* (2013.01); *F02K 1/805* (2013.01); *Y02T 50/672* (2013.01); *F05D 2300/501* (2013.01)
USPC ....................... 239/265.11; 60/230

(58) Field of Classification Search
CPC ........ B64D 29/06; B64D 33/04; F02K 1/805; F02K 1/72; F05D 2300/501; Y02T 50/672
USPC ................ 60/230, 226.2, 242; 239/265.11; 244/131
See application file for complete search history.

(56) References Cited

U.S. PATENT DOCUMENTS

| 4,278,220 | A | * | 7/1981 | Johnston et al. | .......... 244/110 B |
| 4,916,895 | A | * | 4/1990 | Dubois | ......................... 60/226.2 |
| 4,960,243 | A | * | 10/1990 | Dubois et al. | ............ 239/265.29 |

(Continued)

FOREIGN PATENT DOCUMENTS

| EP | 0488453 A1 | 6/1992 |
| FR | 2902839 A1 | 12/2007 |

OTHER PUBLICATIONS

International Search Report PCT/FR2009/000861; Dated Dec. 30, 2009.

*Primary Examiner* — J. Gregory Pickett
(74) *Attorney, Agent, or Firm* — Brinks Gilson & Lione (57) ABSTRACT

The invention relates to a nacelle that comprises a fixed structure (20), a nozzle with a variable section, and a cowling (30) mounted on said fixed structure (20) so as to be capable of sliding particularly along a travel so as to modify the section of said nozzle, characterized in that the nacelle further comprises an aerodynamic continuity assembly (40) provided between the fixed structure (20) and the mobile cowling (30), said assembly (40) including an elastic means that can be compressed between the fixed structure and said mobile cowling when the cowling is in the upstream portion of the travel thereof and that can expand when the cowling is in the downstream portion of the travel thereof so as to ensure the aerodynamic continuity of the lines between said fixed structure (20) and said mobile cowling (30).

12 Claims, 5 Drawing Sheets

(56) References Cited

U.S. PATENT DOCUMENTS

| | | | |
|---|---|---|---|
| 5,211,008 A * | 5/1993 | Fage | 60/226.2 |
| 5,778,659 A * | 7/1998 | Duesler et al. | 60/226.1 |
| 5,987,881 A * | 11/1999 | Gonidec et al. | 60/226.2 |
| 6,000,216 A * | 12/1999 | Vauchel | 60/226.2 |
| 6,101,807 A * | 8/2000 | Gonidec et al. | 60/226.2 |
| 6,385,964 B2 * | 5/2002 | Jean et al. | 60/226.2 |
| 6,663,042 B2 * | 12/2003 | Hatrick et al. | 244/110 B |
| 2001/0010148 A1 * | 8/2001 | Michel et al. | 60/226.1 |
| 2008/0010969 A1 * | 1/2008 | Hauer et al. | 60/204 |

* cited by examiner

NACELLE WITH A VARIABLE NOZZLE SECTION

TECHNICAL FIELD

The present invention concerns a turbojet engine nacelle comprising a variable nozzle section.

BACKGROUND

A nacelle generally has a tubular structure comprising an air intake upstream of the turbojet engine, a median section intended to surround a fan of the turbojet engine, a downstream section housing thrust reverser means, and intended to surround the combustion chamber of the turbojet engine, and generally ends with an jet nozzle whereof the outlet is situated downstream of the turbojet engine.

Modern nacelles are intended to house a dual-flow turbojet engine capable of generating, via the blades of the rotary fan, a hot air flow (also called primary flow) coming from the combustion chamber of the turbojet engine, and a cold air flow (secondary flow) that flows outside the turbojet engine through a jet formed between a fairing of the turbojet engine and an inner wall of the nacelle. The two air flows are ejected from the turbojet engine through the rear of the nacelle.

The role of a thrust reverser is, during landing of an airplane, to improve the braking capacity thereof by redirecting at least part of the thrust generated by the turbojet engine towards the front. In this phase, the reverser obstructs the jet of the cold flow and orients it towards the front of the nacelle, thereby generating a counter-thrust that is added to the braking of the wheels of the airplane.

The means implemented to perform this reorientation of the cold flow vary depending on the type of reverser.

Figure 1:
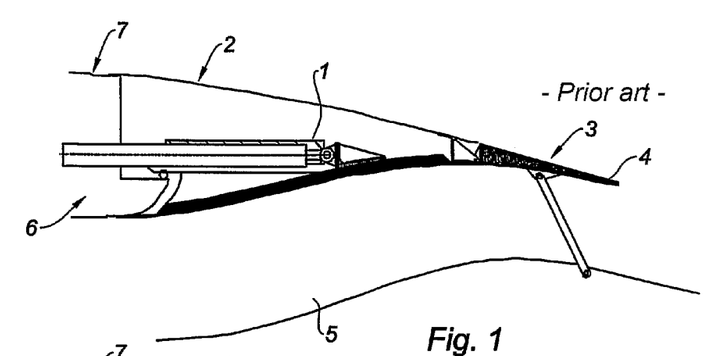
FIGS. 1 and 2 are diagrammatic illustrations in longitudinal cross-section of a thrust reverser device of the prior art having mobile panels in the normal nozzle position and closed nozzle position, respectively.
Figure 2:
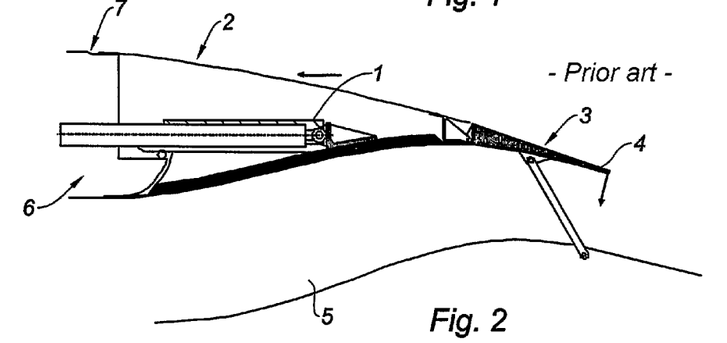
Figure 3:
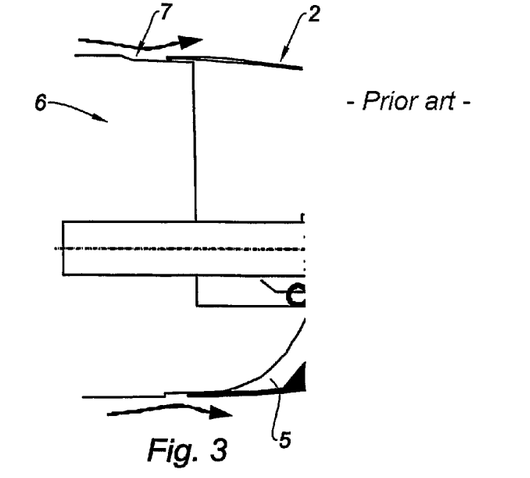
FIG. 3 is a detail view of FIG. 1 on the interface between the mobile cowling and the upstream fixed structure of the thrust reverser device.

Thus, grid reversers are known, as illustrated in FIGS. 1 to 3, in which the reorientation of the air flow is done by cascade vanes 1 associated with a sliding cowling 2 aiming to uncover or cover these vanes 1, the translation of said cowling 2 occurring along a longitudinal axis substantially parallel to the axis of the nacelle.

This sliding cowling 2 is thus capable of going alternatingly from a closing position illustrated in FIG. 1, in which it ensures the aerodynamic continuity of the nacelle and covers the cascade vanes 1, to an open position, in which it opens a passage in the nacelle intended for the cascaded flow and uncovers the cascade vanes 1.

Moreover, aside from its thrust reverser function, the sliding cowling belongs to the rear section and has a downstream side forming the jet nozzle 3 aiming to channel the ejection of the air flows.

This nozzle 3 comprises at least one panel 4 mounted mobile in rotation, said panel 4 being adapted to pivot between a normal position illustrated in FIG. 1, in which it ensures the aerodynamic continuity of the nacelle, a thrust reverser position in which it obstructs the cold flow jet 5 and a position illustrated in FIG. 2, causing a variation of the section of the nozzle 3.

It is possible to adjust the pivot degree of the mobile panel 4 and make it possible either to vary the jet nozzle section 3 or to cause the reversal of the cold air flow in the jet 5 in a reverse jet depending on the degree of displacement of the mobile cowling 2.

Thus, as illustrated in FIG. 2, to reduce the jet nozzle section 3 by driving the panel 4 towards the inside of the jet 5, the mobile cowling 2 must be advanced in the upstream direction towards the upstream fixed structure 6 of the nacelle.

In order to be able to ensure this simple translational movement of the mobile cowling 2 in the upstream direction and, as a result, the free movement between the mobile cowling 2 and the upstream fixed structure 6 of the nacelle, a cavity 7 is created at the interface between these two elements.

However, as illustrated in detail in FIG. 3, the presence of this cavity 7 creates a discontinuity of the aerodynamic lines of the surface of the nacelle causing a degradation of the performance of the propulsion assembly of the latter and an increase in the aircraft's consumption.

BRIEF SUMMARY

One aim of the present invention is to offset the aforementioned drawbacks.

To that end, the invention proposes a nacelle that comprises a fixed structure, a nozzle with a variable section, and a cowling mounted on said fixed structure so as to be capable of sliding particularly along a travel so as to modify the section of said nozzle characterized in that the nacelle further comprises an aerodynamic continuity assembly provided between the fixed structure and the mobile cowling, said assembly including an elastic means capable of being compressed between the fixed structure and said mobile cowling when the cowling is in the upstream portion of the travel thereof and capable of expanding when the cowling is in the downstream portion of the travel thereof so as to ensure the aerodynamic continuity of the lines between said fixed structure and said mobile cowling.

The present invention offers the advantage of offsetting the aerodynamic line flaw in a direct jet between the upstream fixed structure and the mobile cowling while also authorizing the free displacement between these two elements in particular so as to move the mobile cowling 30 towards the upstream of the nacelle to vary the nozzle section.

According to specific embodiments of the invention, the device can comprise one or several of the following features, considered alone or in technically possible combinations:

the aerodynamic continuity assembly comprises a flexible profile of the elastomer type;

the aerodynamic continuity assembly comprises a rigid profile capable of being elastically deformed;

the profile is of the wire spring, plate spring or bellows type;

the aerodynamic continuity assembly comprises a non-deformable rigid profile associated with elastic return means;

the profile is formed in a single piece or several sectors of parts to be assembled together;

the aerodynamic continuity assembly is capable of ensuring the aerodynamic continuity of the external lines between the upstream fixed structure and the mobile cowling;

the aerodynamic continuity assembly is capable of ensuring the aerodynamic continuity of the inner lines between the fixed structure and the mobile cowling;

a heel can be fastened to the upstream end of the mobile cowling;

the aerodynamic continuity element is integral with the fixed structure;

the aerodynamic continuity element is integral with the mobile cowling;

the nacelle comprises a downstream section equipped with a thrust reverser means.

BRIEF DESCRIPTION OF THE DRAWINGS

Other features, aims and advantages of the present invention will appear upon reading the detailed description that follows, according to embodiments provided as non-limiting examples, and done in reference to the appended drawings in which.

DETAILED DESCRIPTION

A nacelle generally has a structure comprising an upstream section forming an air intake, a median section surrounding the fan of the turbojet engine and a downstream section surrounding the turbojet engine.

Figure 4:
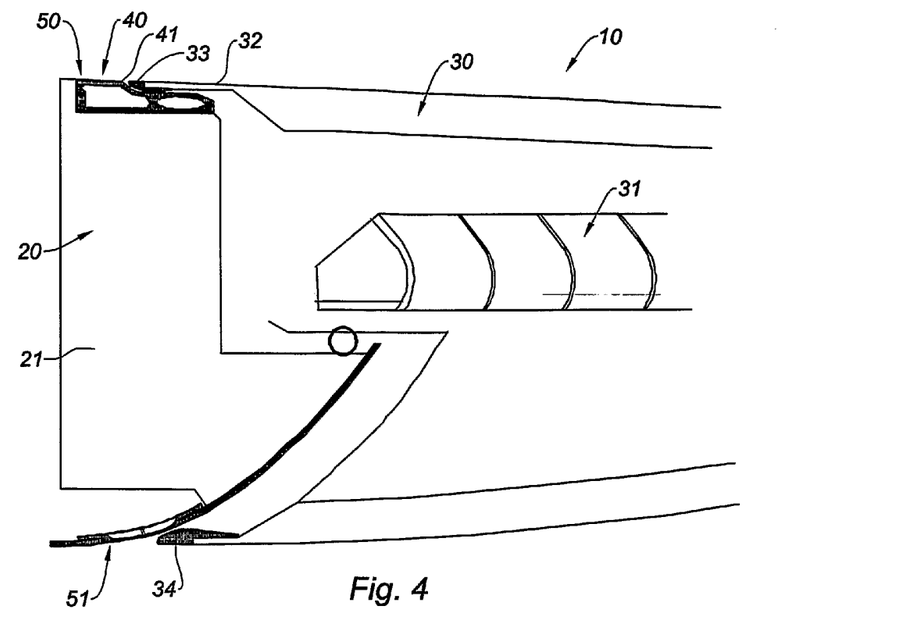
FIG. 4 is a diagrammatic illustration in longitudinal cross-section of a thrust reverser device comprising an aerodynamic continuity assembly according to a first embodiment of the present invention.

Based on FIG. 4, this downstream section comprises an outer structure 10 including a thrust reverser device and an inner engine fairing structure (not shown) defining, with the outer structure 10, a jet (not illustrated) intended for the circulation of a cold flow in the case of the dual-flow turbojet engine nacelle as presented here.

The downstream section also comprises an upstream fixed structure 20 comprising a front frame 21, said upstream fixed structure 20 being extended by a thrust reverser mobile cowling 30 and a jet nozzle section (not illustrated).

The thrust reverser mobile cowling 30 is intended to be actuated in a substantially longitudinal direction of the nacelle between a closing position in which it covers air flow cascade vanes 31 and an open position in which it is spaced away from the front frame 21, then opening a passage in the nacelle by uncovering the air flow cascade vanes.

Moreover, the jet nozzle section in the extension of the mobile cowling 30 comprises a series of mobile panels rotatably mounted at a downstream end of the mobile cowling 30 and distributed on the periphery of the jet nozzle section.

Each mobile panel is adapted to pivot between several positions, i.e. a normal position in which it ensures the aerodynamic continuity of the nacelle, a thrust reverser position in which it obstructs the cold air jet and returns said air towards the cascade vanes 31, which ensure the reorientation of the flow, thereby enabling the reversed jet and positions where they make it possible to vary the nozzle section.

It is the degree of movement of the mobile cowling 30 upstream and downstream, which makes it possible to adjust the degree of pivoting of the mobile panels and, thus, either to vary the jet nozzle section in a direct jet, or to drive the reversal of the cold air flow in the jet in a reverse jet.

In order to allow the movement of the mobile cowling 30 in the upstream direction towards the front frame 21 to make the nozzle section vary, several recesses 50, 51 can be provided between the front frame 21 and the mobile cowling 30 on the outer surface of the nacelle and the inner surface of the front frame 21

According to the invention, an aerodynamic continuity assembly 40 is arranged at the interface of the front frame 21 and the mobile cowling 30 and housed in the recess(es) 50, 51.

This aerodynamic continuity assembly 40 comprises elastic means capable of being compressed between the front frame 21 and the mobile cowling 30 when the cowling is located in the upstream portion of its travel making it possible to cause the nozzle section to vary and capable of expanding when the cowling is located in a downstream portion of its travel so as to ensure the aerodynamic continuity of the lines between the front frame 21 and the mobile cowling 30.

More precisely, this aerodynamic continuity assembly 40 is integrated into the aerodynamic profile of the nacelle assuming several positions, namely:

an expanded position when the cowling 30 is in a position in which the nozzle section does not vary, position in which it is intended to fill in the space present between the downstream end of the front frame 21 and the upstream end of the mobile cowling 30 in order to ensure an aerodynamic continuity of the lines of the downstream section, i.e. that the aerodynamic lines of the front frame 21 and the mobile cowling 30 have no sudden changes of level, and a compressed position in which it is capable of allowing a movement of the mobile cowling 30 upstream to make the nozzle section vary while being covered by the latter during its progression in the upstream direction.

Advantageously, the presence of an aerodynamic continuity element 40 makes it possible to offset the aerodynamic line flaw in direct jet while also allowing movement of the mobile cowling 30 towards the upstream of the nacelle to make the nozzle section vary.

Degradation of the nacelle's performance in direct jet is thus avoided.

Preferably, the aerodynamic continuity element 40 can be placed at the interface between the front frame 21 and the mobile cowling 30 of the outer side of the nacelle and/or the side of the cold air jet thereby ensuring the continuity of the outer aerodynamic lines and/or inner aerodynamic lines between these two elements, as will be seen later in reference to the various figures.

Figure 5:
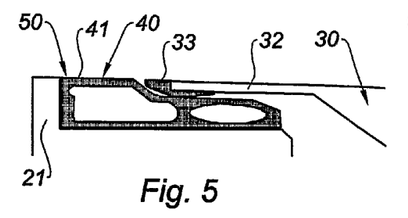
FIGS. 5 to 8 are detail views of FIG. 4 on the interface between a mobile cowling and the upstream fixed structure of the thrust reverser device before and after movement of the mobile cowling upstream, respectively.
Figure 6:
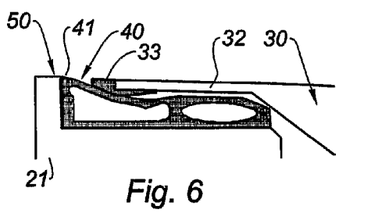

In a first embodiment illustrated in FIGS. 4 to 6, an aerodynamic continuity element 40 is shown assuming the form of a flexible profile 41 capable of ensuring the continuity of the outer aerodynamic line of the nacelle.

This profile 41 thus assumes a shape and dimensions adapted to fill in the space existing between the downstream end of the front frame 21 and the upstream free end of the mobile cowling 30 when the cowling 30 is in a position in which the nozzle section does not vary.

This profile 41 can have a downstream end assuming a covering shape with the upstream end of the mobile cowling 30, in order to keep the smallest possible aerodynamic level change, even during upstream movement of the mobile cowling 30 to make the nozzle section vary.

Advantageously, the aerodynamic continuity element 40 is flexible enough to deform in contact with the upstream end of the mobile cowling 30 when the latter moves by a translational movement in the upstream direction towards the front frame 21 to make the mobile panels of the nozzle pivot, then to resume its neutral position and shape after withdrawal of the cowling 30 downstream.

In one non-limiting example, the profile 41 is generally L-shaped.

It comprises, on one hand, an upstream end configured to be fastened to the front frame 21 and having a shape complementary to the downstream end of the front frame 21 and, on the other hand, having a shape complementary to the upstream end of the mobile cowling 30.

The cowling 30 having, at its upstream free end, a protrusion 32 extending along the longitudinal axis of the nacelle, the upstream end of the profile defined by the cavity of the L is the space needed to receive the protrusion of the mobile cowling 30.

The outer aerodynamic lines of the nacelle are thus smoothed by the presence of the profile 41 between the front frame 21 and the cowling 30.

During upstream movement of the mobile cowling 30, the cowling 30 tends to come into contact with the front frame 21 deforming upon passage of the profile 41, which is housed under the cowling 30.

In one alternative embodiment, the composition of the profile 41 can be reinforced with fibers. It can also be provided to introduce rigid elements into certain zones of the profile 41 that should be non-deformable.

In another alternative embodiment, an elastic element complement can be added to the profile 41, in order to ensure that it indeed resumes its initial shape after withdrawal of the cowling 30 towards the downstream of the nacelle.

In a last embodiment, a heel 33 with an adapted shape can be fastened to the upstream end of the mobile cowling 30, in order to improve the contact interface with the aerodynamic continuity element 40 and, thus, to offer a controlled contact zone.

Figure 7:
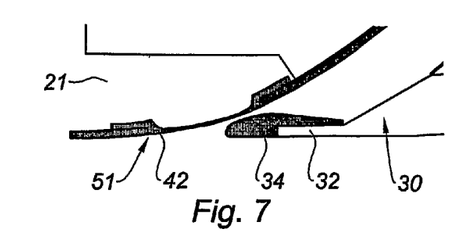
Figure 8:
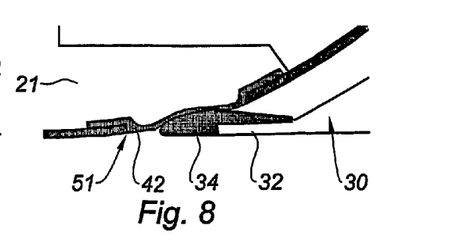

In reference to FIGS. 7 and 8, a flexible aerodynamic continuity element 40 is shown capable of ensuring the continuity of the inner aerodynamic lines of the nacelle on the side of the cold air jet.

In one non-limiting example of the invention, this aerodynamic continuity element 40 can assume the form of a tongue 42 intended to fill in the recess 51 provided in the inner surface of the front frame 21 and, more precisely, on the guide structure of the air flow in the reverser phase.

This longilineal tongue 42 comprises two opposite ends bearing on the inner face of the inner surface of the front frame 21 and a central portion facing the upstream end of the cowling 30.

The central portion of the tongue 42 has a curved section whereof the curvature is defined so as to ensure the continuity of the inner aerodynamic line of the inner surface of the front frame 21.

During the movement of the mobile cowling 30 in the upstream direction towards the front frame 21 to make the nozzle section vary, the upstream end of the mobile cowling 30 penetrates the central portion of the tongue 42 and deforms it.

After withdrawal of the cowling 30 towards the downstream of the nacelle, the tongue 42 resumes its initial shape.

In one alternative embodiment, a heel 34 with an adapted shape can be fastened to the upstream end of the mobile cowling 30, as in FIGS. 4 to 6.

In a second alternative embodiment, the central portion of the tongue can be formed by a dual partition in order to reinforce the aerodynamic continuity element 40. The central portion illustrated in FIGS. 7 and 8 is thus fastened to the T-shaped inner wall in which the bar of the T forms the second wall of the dual partition.

In a second embodiment illustrated in FIGS. 9 to 13, 16 and 17, the aerodynamic continuity assembly 40 comprises a rigid profile 43 capable of being elastically deformed and intended to ensure the continuity of the outer or inner aerodynamic lines of the nacelle.

Figure 10:
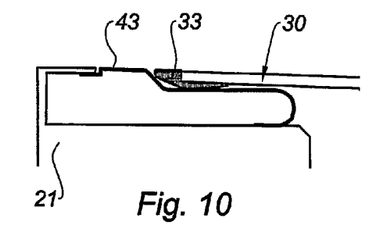
FIGS. 10 to 13 are detail views of FIG. 9 on the interface between a mobile cowling and the upstream fixed structure of the thrust reverser device before and after movement of the mobile cowling upstream, respectively.
Figure 11:
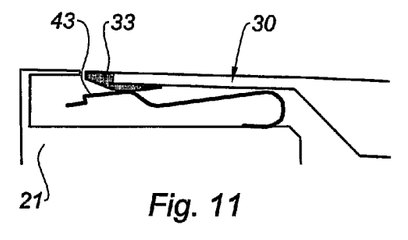

As illustrated in FIGS. 10 to 11, the profile 43 can assume the form of a wire-type spring.

In one non-limiting example of the invention, the profile 43 is generally J-shaped, the concavity thereof being oriented towards the front frame 21.

More precisely, it has a downstream end folded and fastened to the front frame 21, said end being extended by a transitional portion intended to allow the inflection of the profile 43, itself extended by a rectilinear upstream end fastened to the outer surface of the front frame 21 without a sudden change of level therewith.

When the cowling 30 is in a position where the nozzle section does not vary, the upstream end of the cowling 30 is housed against the transitional portion so that the front frame 21, the aerodynamic continuity element 40 and the mobile cowling then do not have any sudden change of level on the outer surface of the nacelle.

During movement of the mobile cowling 30 in the upstream direction towards the front frame 21, the upstream end of the cowling 30 abuts and bears against the transitional portion of the profile 43 driving the bending of the latter, thereby freeing a passage for the advancement of the upstream end of the cowling 30 towards the front frame 21.

Figure 9:
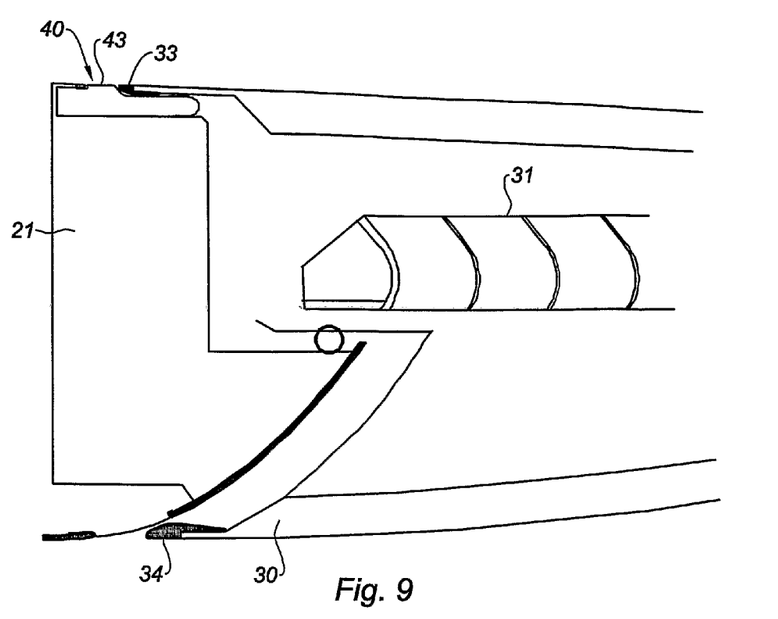
FIG. 9 is a diagrammatic illustration in longitudinal cross-section of a thrust reverser device comprising an aerodynamic continuity assembly according to a second embodiment of the present invention.

The bending point can advantageously be positioned downstream of its structure as shown in FIGS. 9 to 11. It can also be reversed, but requires a greater escape displacement to that end.

The profile 43 can be made from a metal material or a composite material having elastic features allowing the bending of a portion of its structure.

Moreover, inasmuch as the upstream movement of the mobile cowling 30 causes the reduction of the outer diameter of the profile 43, it is necessary to provide slots that extend from the upstream end of the profile to the bending zone thereof to allow its deformation.

Moreover, in order not to reduce the aerodynamic performance of the nacelle by the presence of said slots, they can be filled in by flexible material of the elastomer type.

Figure 12:
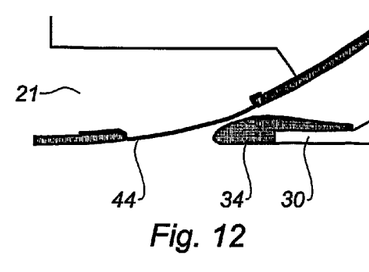
Figure 13:
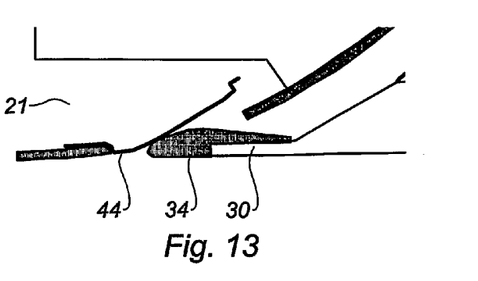

As illustrated in FIGS. 12 and 13, the profile 44 can assume the shape of a plate-type spring capable of ensuring the continuity of the inner aerodynamic lines of the nacelle on the side of the cold flow jet.

This profile 44 assumes a shape similar to that already described in reference to FIGS. 7 and 8.

However, in this embodiment, the profile 44 is rigid and capable of being elastically deformed.

Thus, as illustrated in FIG. 13, during movement of the mobile cowling 30 in the upstream direction towards the front frame 21, to make the nozzle section vary, the upstream end of the mobile cowling 30 bears against the profile 44, which bends towards the inside of the front frame 21, in order not to create aerodynamic disruptions.

More precisely, a free end of the profile 44 not fastened on the inner face of the inner surface of the front frame 21 tilts towards the inside of the front frame to allow said bending.

The fixed connecting portion for connecting with the frame of the profile 44 can be positioned in the lower or upper portion relative to the recess 51.

After withdrawal of the cowling 30 towards the downstream of the nacelle, the profile 44 resumes its initial position.

As in the other considered embodiments, a heel 34 can be fastened to the upstream end of the mobile cowling 30.

Figure 16:
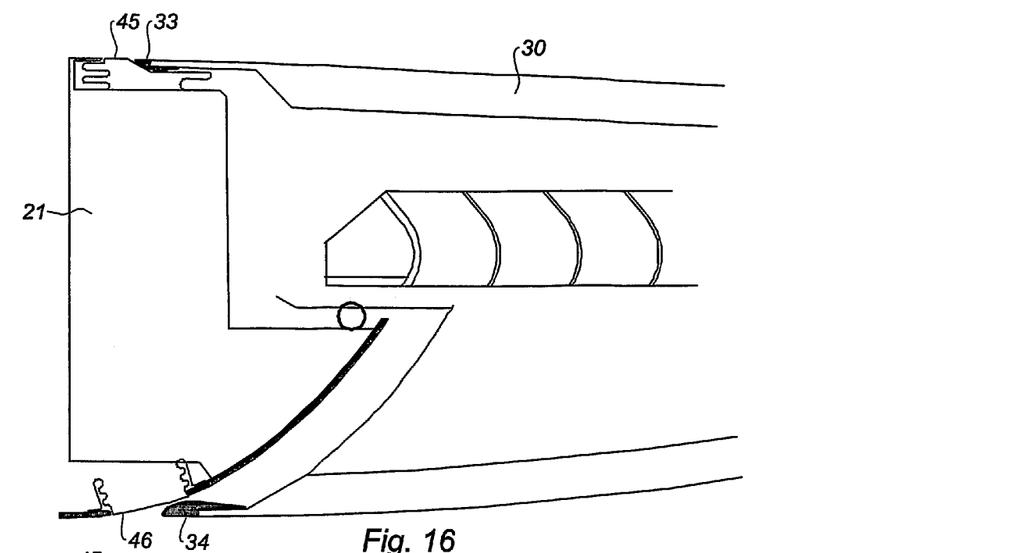
FIGS. 16 and 17 are diagrammatic illustrations in longitudinal cross-section of a thrust reverser device comprising an aerodynamic continuity assembly according to a fourth embodiment of the present invention before and after movement of the mobile cowling upstream, respectively.
Figure 17:
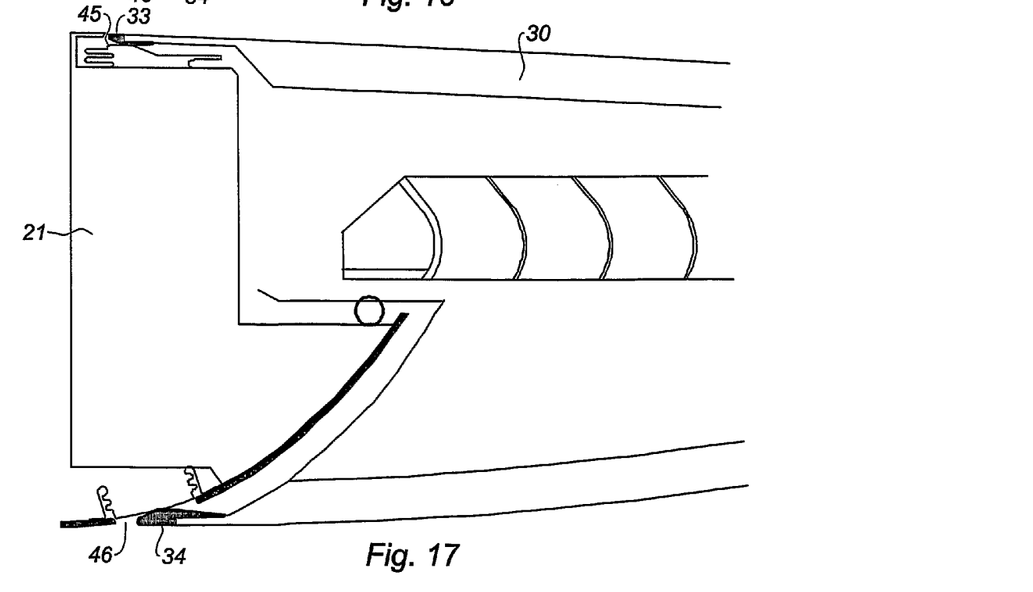

Moreover, in reference to FIGS. 16 and 17, another embodiment of the profile is shown capable of ensuring the continuity of the outer and inner aerodynamic lines of the nacelle in the form of bellow 45 and 46, respectively.

These bellows 45, 46 have shapes and dimensions adapted, as in the other embodiments, to ensure the aerodynamic continuity between the front frame 21 and the cowling 30 when the cowling is not in the nozzle section variation position.

During movement of the cowling 30 in the upstream direction towards the front frame 21 as illustrated in FIG. 17, the upstream end of the cowling 30 bears on the bellows 45, 46, which compresses, freeing a passage for the advancement further upstream of the cowling towards the front frame 21.

After withdrawal of the mobile cowling 30, each bellows 45, 46 resumes its initial shape.

The number of waves of each bellows is determined so as not to exceed the elastic limit thereof.

Figure 14:
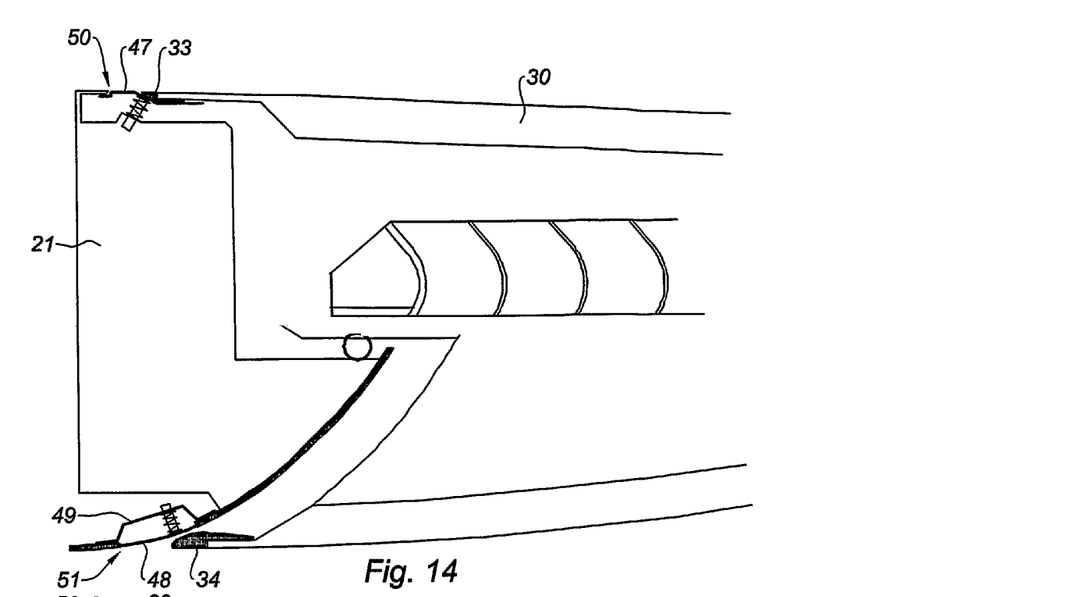
FIGS. 14 and 15 are diagrammatic illustrations in longitudinal cross-section of a thrust reverser device comprising an aerodynamic continuity according to a third embodiment of the present invention before and after movement of the mobile cowling upstream, respectively.
Figure 15:
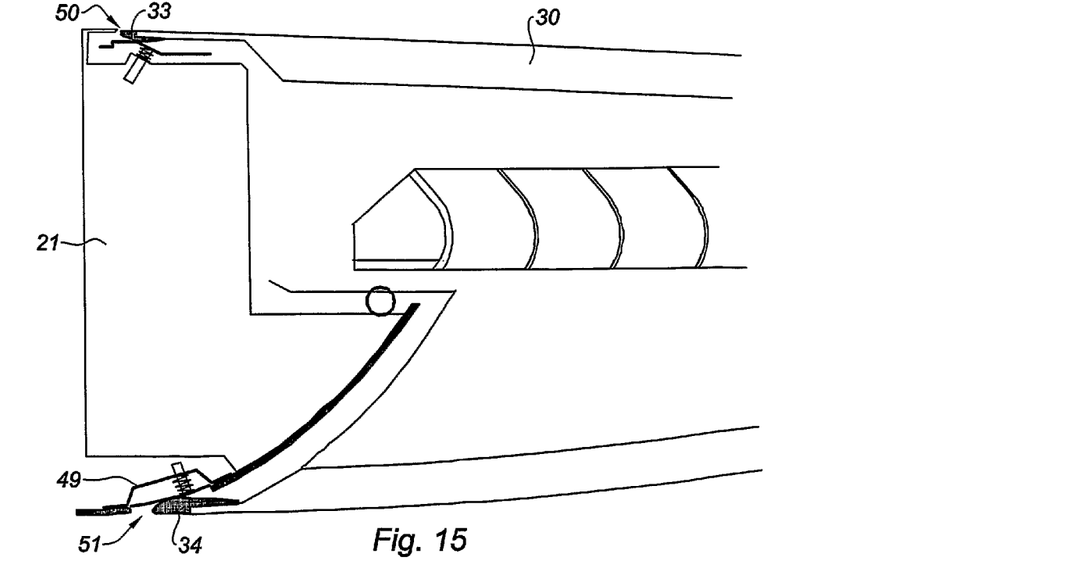

In a third embodiment illustrated in FIGS. 14 and 15, the aerodynamic continuity assembly 40 intended to ensure the continuity of the outer and inner lines of the nacelle comprises a non-deformable rigid profile 47, 48 associated with elastic return means.

More precisely, it comprises a profile 47, 48 fastened to one end of a spring-type element, itself fastened, at the opposite end, to a support structure 49.

The support structure 49 can either be integrated into the front frame 21 as illustrated for the outer surface of the nacelle, or independent of the front frame 21 but fastened thereon as illustrated for the inner surface of the front frame 21.

Similarly to the other embodiments, the profile 47, 48 has a shape and dimensions adapted to fill in the recesses 50, 51 between the front frame 21 and the cowling 30 and to ensure the continuity of the aerodynamic lines between said elements.

Moreover, during movement of the cowling 30 in the upstream direction towards the front frame 21 as illustrated in FIG. 15, the front end of the cowling 30 bears on the profile 47, 48, which compresses owing to the spring, freeing a passage for the advancement of the cowling 30 towards the front frame 21.

The direction of movement of the profile is defined by the direction of the contact stresses at the interface between the profile 47, 48 and the upstream end of the mobile cowling 30.

In all of the described embodiments, the considered profile can be made in a single piece or an assembly of sectors of parts.

Those skilled in the art will appreciate, relative to the nacelles of the prior art, a nacelle proposing a nozzle variable in take-off and landing phases by movement of the mobile cowling beyond its closing position towards the upstream direction of the fixed structure of the nacelle while not having any aerodynamic line flaw in direct jet during the flight phase.

Of course, the invention is not limited to only the embodiments of this nacelle described above as examples, but rather encompasses all possible alternatives.

Thus, the invention can be applied to a nacelle not comprising a thrust reverser means.

The invention can also be applied to a nacelle comprising a thrust reverser device comprising, upstream, thrust reverser flaps under the cascade vanes and a mobile cowling associated, downstream of the nacelle, with mobile panels to ensure the section variation of the jet nozzle.

Moreover, in one alternative embodiment of the present invention, it can be provided that the aerodynamic continuity be integral with the mobile cowling and compressed by the front frame during a movement of the mobile cowling towards the upstream of the nacelle.

The invention claimed is:

1. A nacelle, comprising:
   a fixed structure,
   a mobile cowling extended at a downstream end of the fixed structure by a variable section nozzle, said mobile cowling being mounted on said fixed structure so as to slide along a travel so as to modify the section of said nozzle,
   an aerodynamic continuity assembly provided between the downstream end of the fixed structure and the mobile cowling, said assembly including an elastic means being compressed between the fixed structure and said mobile cowling when the cowling is in an upstream portion of the travel thereof and expanding when the cowling is in a downstream portion of the travel thereof, the elastic means filling a space between the downstream end of the fixed structure and an upstream end of the mobile cowling to form a flexible profile so as to provide aerodynamic continuity between said fixed structure and said mobile cowling along an aerodynamic line of the nacelle.

2. The nacelle according to claim 1, wherein the aerodynamic continuity assembly comprises a flexible profile of an elastomer.

3. The nacelle according to claim 1, wherein the aerodynamic continuity assembly comprises a rigid profile configured to be elastically deformed.

4. The nacelle according to claim 3, wherein the rigid profile is a wire spring, a plate spring or a bellow.

5. The nacelle according to claim 1, wherein the aerodynamic continuity assembly comprises a non-deformable rigid profile associated with elastic return means.

6. The nacelle according to claim 2, wherein the flexible profile is formed in a single piece or several sectors of parts to be assembled together.

7. The nacelle according to claim 1, wherein the aerodynamic continuity assembly provides the aerodynamic continuity of external lines between the downstream end of the fixed structure and the upstream end of the mobile cowling.

8. The nacelle according to claim 1, wherein the aerodynamic continuity assembly provides the aerodynamic continuity of inner lines between the downstream end of the fixed structure and the upstream end of the mobile cowling.

9. The nacelle according to claim 1, wherein a heel is fastened to the upstream end of the mobile cowling.

10. The nacelle according to claim 1, wherein the aerodynamic continuity assembly is integral with the fixed structure.

11. The nacelle according to claim 1, wherein the aerodynamic continuity assembly is integral with the mobile cowling.

12. The nacelle according to claim 1, further comprising a downstream section equipped with a thrust reverser means.

* * * * *